(12) United States Patent
Zhang

(10) Patent No.: US 10,416,495 B2
(45) Date of Patent: Sep. 17, 2019

(54) BACKLIGHT CONTROL METHOD AND LIQUID CRYSTAL DISPLAY DEVICE

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventor: Yuxin Zhang, Qingdao (CN)

(73) Assignees: HISENSE ELECTRIC CO., LTD., Shandong (CN); HISENSE USA CORPORATIONGA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/853,598

(22) Filed: Dec. 22, 2017

(65) Prior Publication Data

US 2018/0180941 A1 Jun. 28, 2018

(30) Foreign Application Priority Data

Dec. 23, 2016 (CN) .......................... 2016 1 1203637

(51) Int. Cl.
*G09G 3/36* (2006.01)
*G02F 1/1335* (2006.01)
*G09G 3/34* (2006.01)

(52) U.S. Cl.
CPC ..... *G02F 1/133602* (2013.01); *G09G 3/3406* (2013.01); *G09G 3/3426* (2013.01);
(Continued)

(58) Field of Classification Search
CPC ................ G09G 3/3426; G09G 3/3406; G02F 1/133602
(Continued)

(56) References Cited

U.S. PATENT DOCUMENTS

| 2009/0079359 A1* | 3/2009 | Shteynberg | ........ H05B 33/0818 |
| | | | 315/291 |
| 2015/0116379 A1* | 4/2015 | Lim | ..................... G09G 3/3406 |
| | | | 345/691 |
| 2016/0335957 A1* | 11/2016 | Fu | ........................ G09G 3/2018 |

FOREIGN PATENT DOCUMENTS

| CN | 101426313 A | 5/2009 |
| CN | 103310739 A | 9/2013 |

(Continued)

OTHER PUBLICATIONS

The Chinese First Examination Report of corresponding China patent application No. 201611203637.6, dated Jun. 25, 2018.

*Primary Examiner* — Adam J Snyder

(74) *Attorney, Agent, or Firm* — J.C. Patents

(57) ABSTRACT

Disclosed are a backlight control method and a liquid crystal display device, where the backlight control method includes generating backlight data of a backlight partition corresponding to an image partition according to grayscale data of each of the image partition in an image to be displayed; generating a PWM backlight control signal for the each of the backlight partition according to a grayscale interval where the backlight data of the each of the backlight partition lies, where current amplitudes of PWM backlight control signals corresponding to backlight data in different grayscale intervals are different; and controlling a backlight source of the each of the backlight partition according to the PWM backlight control signal for the each of the backlight partition.

14 Claims, 13 Drawing Sheets

(52) U.S. Cl.
CPC ............ *G02F 2001/133601* (2013.01); *G09G 2320/064* (2013.01); *G09G 2320/0633* (2013.01); *G09G 2320/0646* (2013.01)

(58) Field of Classification Search
USPC ........................................................ 345/102
See application file for complete search history.

(56) References Cited

FOREIGN PATENT DOCUMENTS

| | | |
|---|---|---|
| CN | 104505055 A | 4/2015 |
| CN | 105575342 A | 5/2016 |
| KR | 10-2008-0062848 A | 7/2008 |

* cited by examiner

| | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 2 | | | | | | | | | | | | | | | |
| 3 | | | | | | | | | | | | | | | |
| 4 | | | | | | | | | | | | | | | |
| 5 | | | | | | | | | | | | | | | |
| 6 | | | | | | | | | | | | | | | |
| 7 | | | | | | | | | | | | | | | |
| 8 | | | | | | | | | | | | | | | |
| 9 | | | | | | | | | | | | | | | |

FIG. 18

BACKLIGHT CONTROL METHOD AND LIQUID CRYSTAL DISPLAY DEVICE

CROSS-REFERENCE TO RELATED APPLICATIONS

This application claims priority to Chinese Patent Application No. 201611203637.6, filed on Dec. 23, 2016, which is hereby incorporated by reference in its entirety.

TECHNICAL FIELD

The present application relates to the field of liquid crystal display technology, and in particular, to a backlight control method and a liquid crystal display device.

BACKGROUND

The existing liquid crystal display device usually adopts the multi-partitioned dynamic backlight modulation technology to control the brightness of the backlight source. The entire backlight source matrix is divided into at least one partition. The image processing unit extracts the backlight data of the backlight partition according to the grayscale data of the partition image corresponding to the backlight partition, sends the backlight data to the backlight processing unit, and then converts the backlight data into a PWM backlight control signal so as to control the backlight driving part to get command of the brightness of the backlight source in the backlight partition. As such, the portion of the high grayscale image corresponds to a higher brightness of the backlight, and the portion of the low grayscale image corresponds to the lower brightness of the backlight, therefore contrast of light and shade on the screen is improved.

SUMMARY

The technical solution adopted by the embodiments of the present application is as follows.

In a first aspect, a backlight control method is provided. The method includes: generating backlight data of a backlight partition corresponding to an image partition according to grayscale data of each of the image partition in an image to be displayed; generating a PWM backlight control signal for each of the backlight partition according to a grayscale interval where the backlight data of the each of the backlight partition lies, where current amplitudes of PWM backlight control signals corresponding to backlight data in different grayscale intervals are different; and controlling a backlight source of the each of the backlight partition according to the PWM backlight control signal for the each of the backlight partition.

In a second aspect, a backlight control method is provided. The method includes: generating backlight data of a backlight partition corresponding to an image partition according to grayscale data of each of the image partition in an image to be displayed; generating a PWM backlight control signal for each of the backlight partition according to a grayscale interval where the backlight data of the each of the backlight partition lies, where duty ratio converting relations corresponding to the backlight data in different grayscale intervals are different; and controlling a backlight source of the each of the backlight partition according to the PWM backlight control signal for the each of the backlight partition.

In a third aspect, a backlight control method is provided. The method includes: generating backlight data of a backlight partition corresponding to an image partition according to grayscale data of each image partition in an image to be displayed; generating a PWM backlight control signal for each backlight partition according to a grayscale interval where backlight data of the each of the backlight partition lies, a duty ratio converting relation corresponding to the grayscale interval and a current amplitude of the PWM control signal corresponding to the grayscale interval, where duty ratio converting relations corresponding to the backlight data in different grayscale intervals are different; current amplitudes of PWM backlight control signals corresponding to backlight data in different grayscale intervals are different; and controlling a backlight source of the each of the backlight partition according to the PWM backlight control signal for the each of the backlight partition.

In a fourth aspect, a liquid crystal display device is provided. The liquid crystal display device includes a first processor, a switching circuit, a current setting circuit, and a backlight source; the first processor, the switching circuit, the current setting circuit, and the backlight source are successively connected. Where the first processor is configured to generate backlight data of a backlight partition corresponding to an image partition according to grayscale data of each image partition in an image to be displayed, and to determine a grayscale interval where the backlight data of each backlight partition lies, where the image partition and the backlight partition are in one-to-one correspondence, and the backlight partition includes at least one backlight source; the switching circuit is configured to switch the backlight data to a corresponding current setting circuit according to the grayscale interval where the backlight data of the each of the backlight partition lies, so as to generate a PWM backlight control signal for the each of the backlight partition, where current setting circuits corresponding to backlight data of different grayscale intervals are different; the different current setting circuits are used for generating PWM backlight control signals with different current amplitudes; and the backlight source of the each of the backlight partition is turned on or off in response to the PWM backlight control signal for the each of the backlight partition.

In a fifth aspect, a liquid crystal display device is provided. The liquid crystal display device includes a first processor, a switching circuit, a duty ratio converting circuit and a backlight source; the first processor, the switching circuit, the duty ratio converting circuit and the backlight source are successively connected; where the first processor is configured to generate backlight data of a backlight partition corresponding to an image partition according to grayscale data of each of the image partition in an image to be displayed, and to determine a grayscale interval where the backlight data of each of the backlight partition lies, where the image partition and the backlight partition are in one-to-one correspondence, and the backlight partition includes at least one backlight source; the switching circuit is configured to switch the backlight data to a corresponding duty ratio converting circuit according to the grayscale interval where the backlight data of the each of the backlight partition lies, so as to generate a PWM backlight control signal for the each of the backlight partition, where duty ratio converting relations corresponding to different duty ratio converting circuits are different; and the backlight source of the each of the backlight partition is turned on or off in response to the PWM backlight control signal for the each of the backlight partition.

In a sixth aspect, a liquid crystal display device is provided. The liquid crystal display device includes a first processor, a switching circuit, a duty ratio converting circuit, a current setting circuit and a backlight source; the first processor, the duty ratio converting circuit, the switching circuit, the current setting circuit and the backlight source are successively connected. where the first processor is configured to generate backlight data of a backlight partition corresponding to an image partition according to grayscale data of each of the image partition in an image to be displayed, and to determine a grayscale interval where the backlight data of each of the backlight partition lies, where the image partition and the backlight partition are in one-to-one correspondence, and the backlight partition includes at least one backlight source; the switching circuit is configured to switch the backlight data to a corresponding duty ratio converting circuit and a corresponding current setting circuit according to the grayscale interval where the backlight data of the each of the backlight partition lies, so as to generate a PWM backlight control signal for the each of the backlight partition, where duty ratio converting relations corresponding to different duty ratio converting circuits are different; current amplitudes of the PWM backlight control signals corresponding to different current setting circuits are different; and the backlight source of the each of the backlight partition is turned on or off in response to the PWM backlight control signal for the each of the backlight partition.

In a seventh aspect, a backlight control device is provided. The device includes: a determining module, a generating module, and a control module; the determining module, the generating module, and the control module are successively connected; where the determining module is configured to generate backlight data of a backlight partition corresponding to an image partition according to grayscale data of each of the image partition in an image to be displayed; the generating module is configured to generate a PWM backlight control signal for each of the backlight partition according to a grayscale interval where the backlight data of the each of the backlight partition lies, where current amplitudes of PWM backlight control signals corresponding to backlight data in different grayscale intervals are different; and the control module is configured to control a backlight source of the each of the backlight partition according to the PWM backlight control signal for the each of the backlight partition.

In an eighth aspect, a backlight control device is provided. The device includes: a determining module, a generating module, and a control module; the determining module, the generating module, and the control module are successively connected; where the determining module is configured to generate backlight data of a backlight partition corresponding to an image partition according to grayscale data of each of the image partition in an image to be displayed; the generating module is configured to generate a PWM backlight control signal for each of the backlight partition according to a grayscale interval where the backlight data of the each of the backlight partition lies, where duty ratio converting relations corresponding to the backlight data in different grayscale intervals are different; and the control module is configured to control a backlight source of the each of the backlight partition according to the PWM backlight control signal for the each of the backlight partition.

In a ninth aspect, a backlight control device is provided. The device includes: a determining module, a generating module, and a control module; the determining module, the generating module, and the control module are successively connected; where the determining module is configured to generate backlight data of a backlight partition corresponding to an image partition according to grayscale data of each of the image partition in an image to be displayed; the generating module is configured to generate a PWM backlight control signal for each of the backlight partition according to a grayscale interval where backlight data of the each of the backlight partition lies, a duty ratio converting relation corresponding to the grayscale interval and a current amplitude of the PWM control signal corresponding to the grayscale interval, where duty ratio converting relations corresponding to the backlight data in different grayscale intervals are different; current amplitudes of PWM backlight control signals corresponding to backlight data in different grayscale intervals are different; and the control module is configured to control a backlight source of the each of the backlight partition according to the PWM backlight control signal for the each of the backlight partition.

BRIEF DESCRIPTION OF DRAWINGS

To describe the technical solutions in the embodiments of the present application more clearly, the accompanying drawings required for describing the embodiments are briefly introduced as follows. Apparently, the accompanying drawings in the following description show some embodiments of the present application, and persons of ordinary skill in the art may still derive other drawings from these accompanying drawings without resorting to creative efforts.

FIG. 18 is a schematic diagram of backlight partition in multi-partitioned dynamic backlight modulation technology;

DESCRIPTION OF EMBODIMENTS

To make the objectives, technical solutions, and advantages of the embodiments of the present application more comprehensible, the technical solutions in the embodiments of the present application are clearly and completely described in the following with reference to the accompanying drawings in the embodiments of the present application. Apparently, the described embodiments are part of rather than all of the embodiments of the present application. All other embodiments obtained by a person of ordinary skill in the art based on the embodiments of the present application without resorting to creative efforts shall fall within the protecting scope of the present application.

Figure 2:
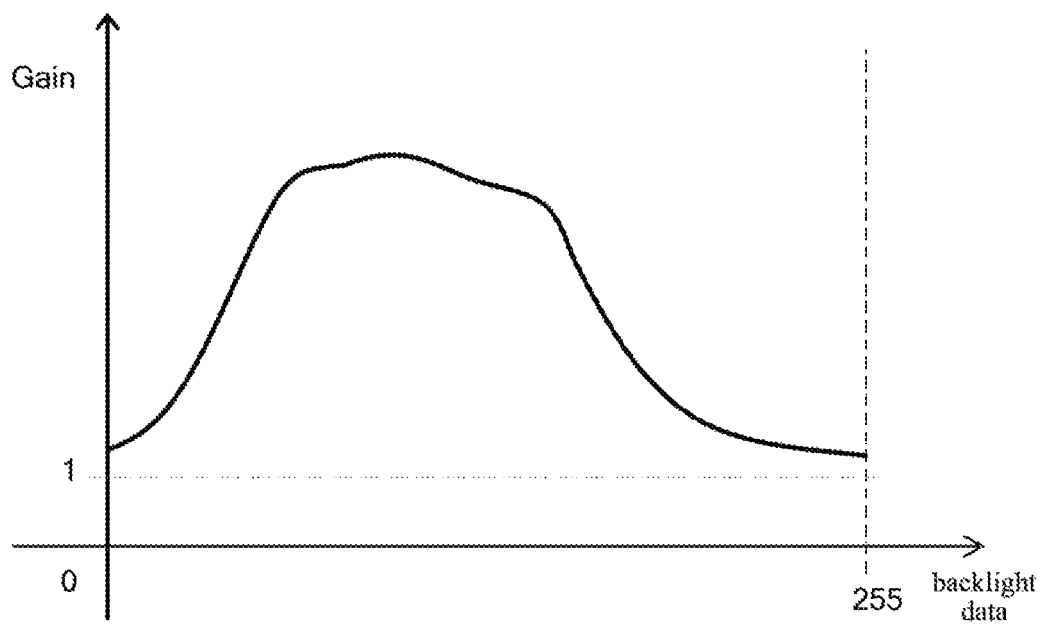
FIG. 2 is a schematic diagram of a backlight data gain curve in the related art.

When using the related art, taking an 8 bits liquid crystal display device as an example (it can be understood by those skilled in the art that the 8 bits shown is merely exemplary and not limitative), the inventor found that in a liquid crystal display device having a grayscale display capability of 8 bits, the processing range of grayscale data was from grayscale 0 to grayscale 255. Therefore, when the grayscale of backlight data approaches 255, the backlight data cannot be further increased. As can be seen in FIG. 2, the backlight gain value approaches 1 in case that highlight backlight data is approached. As such, the brightness of the low brightness image can be controlled through a backlight data gain in the related art, but the related art cannot achieve when the inventor wants to improve the brightness of the backlight by increasing the backlight data. However, increasing the backlight brightness of highlighted images is necessary for HDR image display.

The technical solution proposed by the present application enables the inventor to increase the backlight brightness corresponding to the high backlight data area.

All the embodiments in the present application take the 8 bits ($2^8$=256 grayscale levels) liquid crystal display as an example. However, the applying scope of the technical solution provided by the present application is not limited to the 8 bits liquid crystal display.

Figure 4:
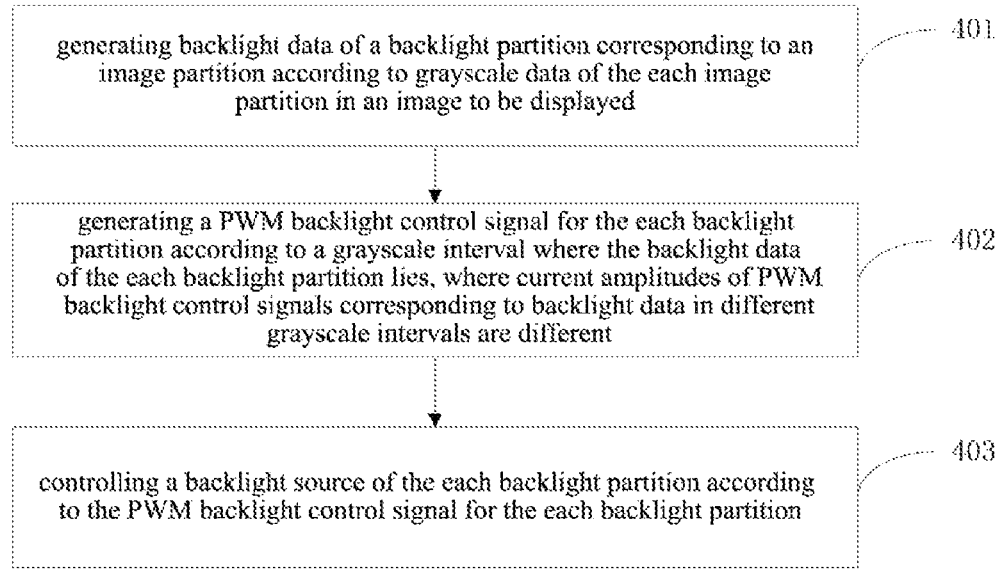
FIG. 4 is a flow diagram of a backlight control method according to an embodiment of the present application.

As shown in FIG. 4, the present application provides a backlight control method for use in a liquid crystal display device. The method may include:

step 401, generating backlight data of a backlight partition corresponding to an image partition according to grayscale data of each of the image partition in an image to be displayed;

step 402, generating a Pulse-Width Modulation (PWM) backlight control signal for each of the backlight partition according to a grayscale interval where the backlight data of the each of the backlight partition lies, where current amplitudes of PWM backlight control signals corresponding to backlight data in different grayscale intervals are different; and step 403, controlling a backlight source of the each of the backlight partition according to the PWM backlight control signal for the each of the backlight partition.

It needs to be defined that the backlight data is converted by the image grayscale data and used to indicate the backlight brightness required for image display, and the backlight control signal is used to control the brightness of the backlight.

In the dynamic backlight control liquid crystal display device, the higher the brightness of the image content is, the greater the backlight brightness will be.

Generating backlight data of a backlight partition corresponding to an image partition according to grayscale data of the each of the image partition in an image to be displayed; generating a PWM backlight control signal for the each of the backlight partition according to a grayscale interval where the backlight data lies, where current amplitudes of PWM backlight control signals corresponding to backlight data lying in different grayscale intervals are different. In some embodiments, current amplitudes of PWM backlight control signals corresponding to backlight data lying in a same grayscale interval are the same, whereas current amplitudes of PWM backlight control signals corresponding to backlight data lying in different grayscale intervals are different. Finally, according to the generated PWM backlight control signal for the each of the backlight partition, controlling the corresponding backlight source of the backlight partition.

In some embodiments, in the multi-partitioned dynamic backlight modulation technology, the backlight data of each of the backlight partition is determined by the grayscale data of the corresponding partitioned image. In the practical process, the partitioned image corresponding to each of the backlight partition is first determined in the image to be displayed. Where the to-be-displayed image includes multiple partitioned images, and each of the partitioned images correspond to one or more backlight partitions.

Figure 18:
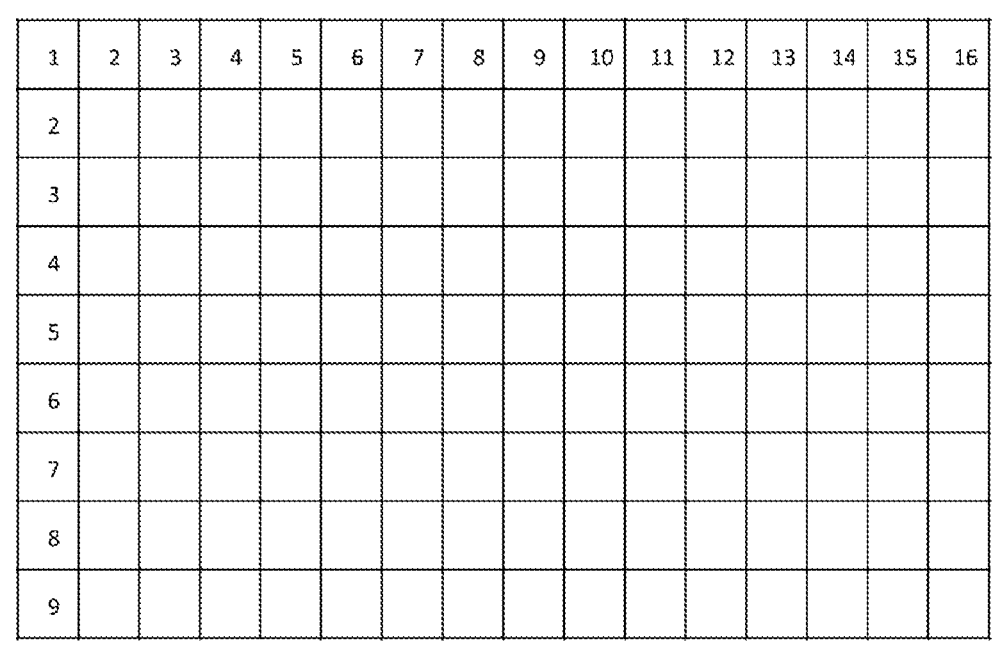

For example, FIG. 18 is a schematic diagram of backlight partition in multi-partitioned dynamic backlight modulation technology. As shown in FIG. 18, the backlight source matrix of the liquid crystal display device is divided into 16 partitions in the row direction, while 9 partitions in the column direction, thus the whole backlight source matrix is divided into 144 backlight partitions. In some embodiments, the backlight source may be LED backlight; correspondingly, according to the dividing rules of the backlight partition, there are 16*9 virtual partitions on the liquid crystal display panel, and further the to-be-displayed image is divided into 16*9 partitioned images corresponding to the backlight partition according to the displayed position of virtual partition of the image data on the liquid crystal display panel.

In some embodiments, the grayscale values of the pixels included in the each partitioned image are counted to respectively form the grayscale data of the corresponding partitioned image, and then the backlight data of the backlight source in the backlight partition corresponding to the partitioned image is extracted.

In some embodiments, the backlight data of each backlight partition may be determined through various possible implementations. For example, the backlight data of the backlight partition may be determined according to the average grayscale value of pixels in the partitioned image, the weighted values of the grayscale levels of the pixels in the partitioned image, and the average of the grayscale maximums of the three sub-pixels i.e., red, green and blue. As a matter of course, in the practical process, the backlight data of each backlight partition may also be determined by other manners, which will not be specifically defined in this application.

In some embodiments, assuming that 5*5 pixels are included in the partitioned image 1 corresponding to the backlight partition $1_2$, the grayscale values of pixels in the partitioned image 1 are shown in Table 1. It follows that the average grayscale value of the pixels shown in Table 1 is 145, and the average value 145 is determined as the backlight data of the backlight partition $1_2$.

TABLE 1

| 120 | 130 | 125 | 145 | 200 |
| 220 | 200 | 125 | 130 | 145 |
| 145 | 120 | 130 | 125 | 145 |
| 145 | 200 | 130 | 125 | 145 |
| 200 | 130 | 125 | 210 | 220 |

In some embodiments, according to the different grayscale display requirements of the bright-dark scenarios in images and at least one arbitrary threshold of grayscale data, with the threshold of grayscale data taken as a boundary, a plurality of arbitrary grayscale intervals are set in the range from grayscale value 0 to the maximum displayable grayscale value of the liquid crystal display device, so as to obtain the backlight data of the corresponding interval according to the grayscale data of different intervals.

In some embodiments, with an 8 bits ($2^8$=256 grayscale levels) liquid crystal display taken as an example, it is assumed that the first grayscale threshold and the second grayscale threshold are 100, 150 respectively. It can be understood by those skilled in the art that the 100 (the first grayscale threshold) and 150 (the second grayscale threshold) are merely shown as an example and not limitative. Those skilled in the art can set a grayscale threshold according to practical scenarios, needs and experience. As such, the grayscale interval is divided into a low light grayscale interval of 0-100, a medium light grayscale interval of 100-150, and a highlight grayscale interval of 150-256. That is, if the received grayscale data is smaller than the first grayscale threshold 100, it is determined that the grayscale data is in a low light grayscale interval, and the brightness of the image corresponding to the low light grayscale interval is low; if the received grayscale data is greater than the first grayscale threshold 100 and smaller than the second grayscale threshold 150, it is determined that the grayscale data is in a medium light grayscale interval and the brightness of the image corresponding to the medium light grayscale interval is high; and if the received grayscale data is greater than the second grayscale threshold 150, it is determined that the grayscale data is in a highlight grayscale interval, and the brightness of the image corresponding to the highlight grayscale interval is the highest.

It should be noted that, in this embodiment, more backlight grayscale intervals, for example, four or more grayscale intervals, or less backlight grayscale intervals, for example, only two grayscale intervals may be set according to other implementing method or according to actual needs, which is not defined herein. For example, it is also possible to set a plurality of arbitrary intervals with the threshold of backlight data taken as a boundary according to at least one arbitrary threshold of backlight data after the backlight data corresponding to the backlight partition is determined according to the grayscale data of the partitioned image.

The following describes in detail an example of converting backlight data in different gray intervals into a corresponding backlight control signal.

In some embodiments, according to the different grayscale display requirements of the bright-dark scenarios in images, it is assumed that two arbitrary thresholds are 80 and 170 which are merely exemplary and not limitative, as understood by those skilled in the art. The backlight data is set into a low light grayscale interval, a medium light grayscale interval and a high light grayscale interval with the two thresholds, where the grayscale data and the backlight data in the three grayscale intervals are sorted from small to large as follows: low light grayscale interval<medium light grayscale interval<highlight grayscale interval.

Figure 5:
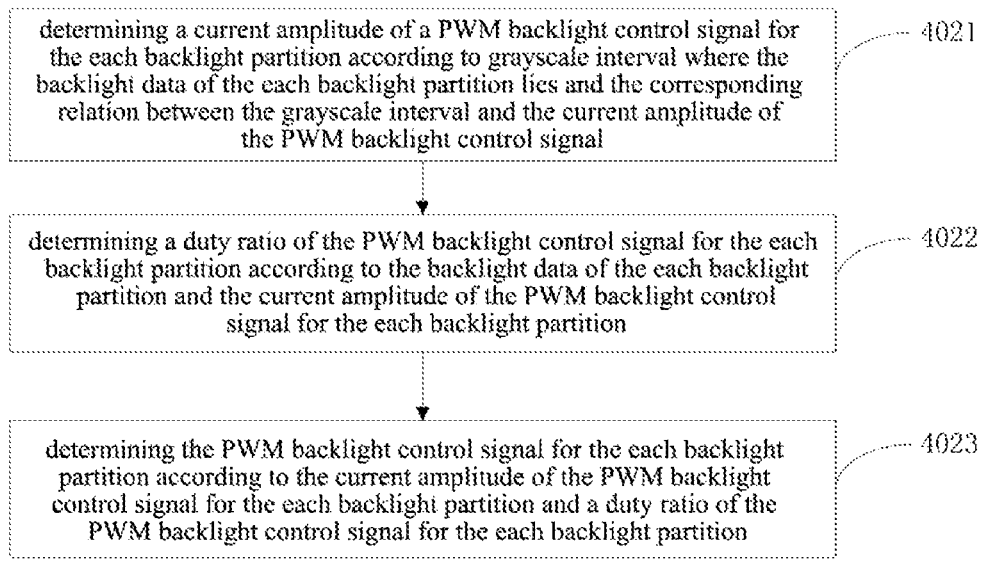
FIG. 5 is another flow diagram of a backlight control method according to an embodiment of the present application.

In some embodiments, as shown in FIG. 5, step 402 includes: step 4021, determining a current amplitude of a PWM backlight control signal for the each of the backlight partition according to grayscale interval where the backlight data of the each of the backlight partition lies and the corresponding relation between the grayscale interval and the current amplitude of the PWM backlight control signal; step 4022: determining a duty ratio of the PWM backlight control signal for the each of the backlight partition according to the backlight data of the each of the backlight partition and the current amplitude of the PWM backlight control signal for the each of the backlight partition; and step 4023: determining the PWM backlight control signal for the each of the backlight partition according to the current amplitude of the PWM backlight control signal for the each of the backlight partition and a duty ratio of the PWM backlight control signal for the each of the backlight partition.

First, in step 4021, the current amplitude of the PWM backlight control signal for each of the backlight partition is determined according to the corresponding relation between the grayscale interval and the current amplitude of the PWM backlight control signal; then in step 4022, the duty ratio of the PWM backlight control signal for the each of the backlight partition is determined according to the backlight data and the current amplitude of the PWM backlight control signal determined in step 4021. After the current amplitude and the duty ratio of the PWM backlight control signal for the each of the backlight partition are determined, according to both the current amplitude and the duty ratio, the PWM backlight control signal for the backlight partition is determined in step 4023.

In some embodiments, the grayscale interval refers to at least two grayscale intervals from grayscale value 0 to the maximum displayable grayscale value of the liquid crystal display device.

Figure 6:
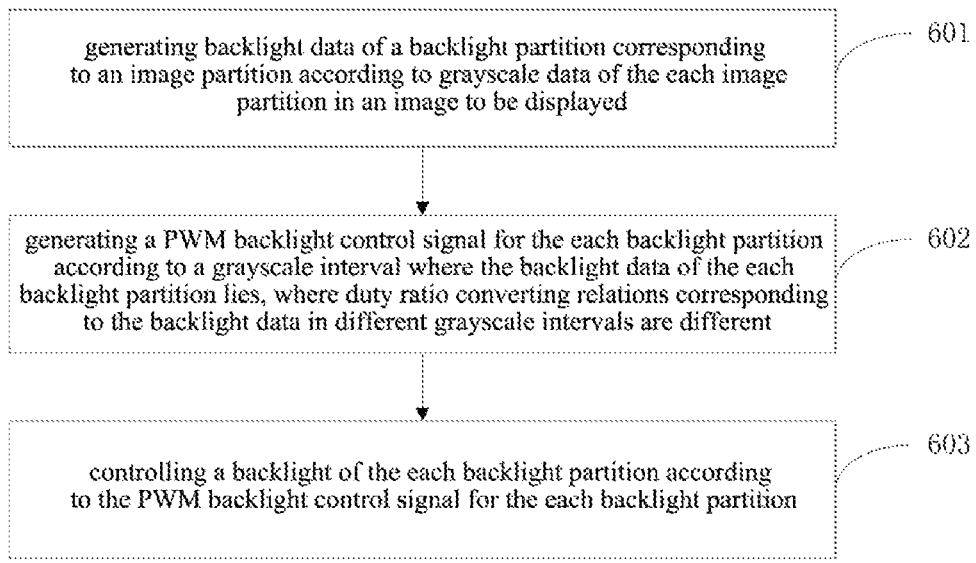
FIG. 6 is a flow diagram of another backlight control method according to an embodiment of the present application.

As shown in FIG. 6, the present application provides another backlight control method for use in a liquid crystal display device. The method may include:

step 601, generating backlight data of a backlight partition corresponding to an image partition according to grayscale data of each of the image partition in an image to be displayed;

step 602, generating a PWM backlight control signal for each of the backlight partition according to a grayscale interval where the backlight data of the each of the backlight partition lies, where duty ratio converting relations corresponding to the backlight data in different grayscale intervals are different;

step 603, controlling a backlight of the each of the backlight partition according to the PWM backlight control signal for the each of the backlight partition.

Similarly to step 401 of the backlight control method mentioned above, it is possible to first generate backlight data of a backlight partition corresponding to an image partition according to grayscale data of the each of the image partition in an image to be displayed. The implementing process of step 601 is similar to step 401. For more detail, reference can be made to step 401 in the method described above, which will not be described herein again.

After determining the backlight data of each of the backlight partition in step 601, in step 602, generating a PWM backlight control signal for the each of the backlight partition according to a grayscale interval where the backlight data of the each of the backlight partition lies, where duty ratio converting relations corresponding to the backlight data in different grayscale intervals are different. That is, the PWM backlight control signal in this method is generated based on the different corresponding relations between the grayscale intervals and the duty ratio converting relations. In other words, duty ratio converting relations corresponding to backlight data in a same grayscale interval are the same, while duty ratio converting relations corresponding to the backlight data in different grayscale intervals are different. Where the converting relation may be a corresponding relation table, which may be a functional curve.

In the subsequent step 603, controlling a backlight source of the each of the backlight partition according to the generated PWM backlight control signal. The step is similar to step 403 in the method as mentioned above. For more detail, reference can be made to step 403 in the method described above, which will not be described herein again.

Figure 7:
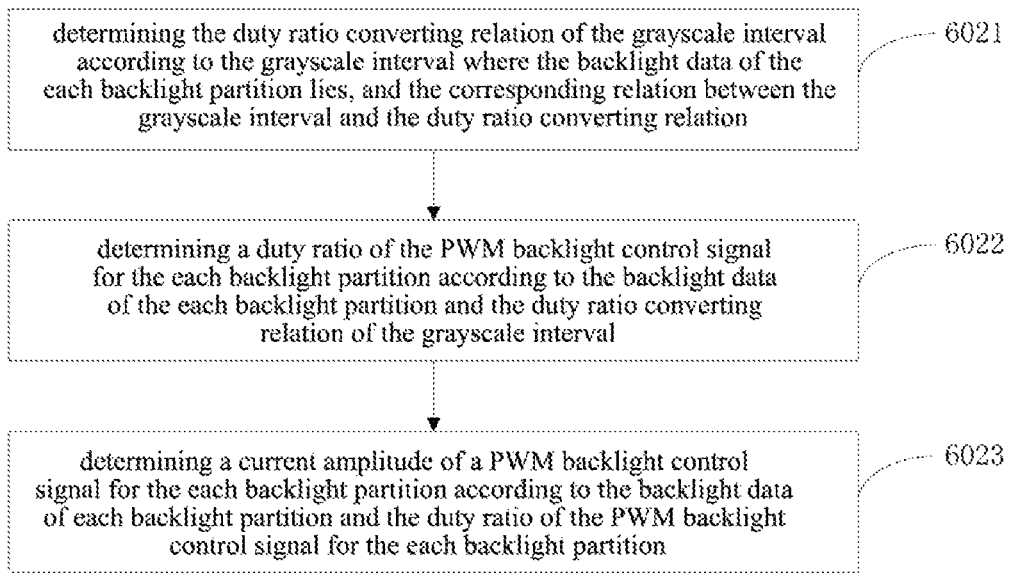
FIG. 7 is another flow diagram of another backlight control method according to an embodiment of the present application.

Referring to FIG. 7, step 602 includes the following steps:

step 6021, determining the duty ratio converting relation of the grayscale interval according to the grayscale interval where the backlight data of the each of the backlight partition lies, and the corresponding relation between the grayscale interval and the duty ratio converting relation;

step 6022: determining a duty ratio of the PWM backlight control signal for the each of the backlight partition according to the backlight data of the each of the backlight partition and the duty ratio converting relation of the grayscale interval;

step 6023: determining a current amplitude of a PWM backlight control signal for the each of the backlight partition according to the backlight data of each of the backlight partition and the duty ratio of the PWM backlight control signal for the each of the backlight partition;

and step 6024: determining the PWM backlight control signal for the each of the backlight partition according to the current amplitude of the PWM backlight control signal for the each of the backlight partition and a duty ratio of the PWM backlight control signal for the each of the backlight partition.

After the backlight data of each of the backlight partition is determined, it is possible to determine the duty ratio converting relation corresponding to the each of the grayscale interval according to the grayscale interval where the backlight data of the each of the backlight partition lies and the predefined corresponding relation between the grayscale interval and the duty ratio converting relation in step 6021. Subsequently, in step 6022, the duty ratio of the PWM backlight control signal for each of the backlight partition is determined according to the determined duty ratio converting relation. After the duty ratio of the PWM backlight control signal for the each of the backlight partition is determined, the corresponding current amplitude may be further determined according to the backlight data and the duty ratio in step 6023. Finally, the PWM backlight control signal is determined according to the current amplitude and duty ratio.

In some embodiments, the grayscale interval refers to at least two grayscale intervals from grayscale value 0 to the maximum displayable grayscale value of the liquid crystal display device.

Figure 8:
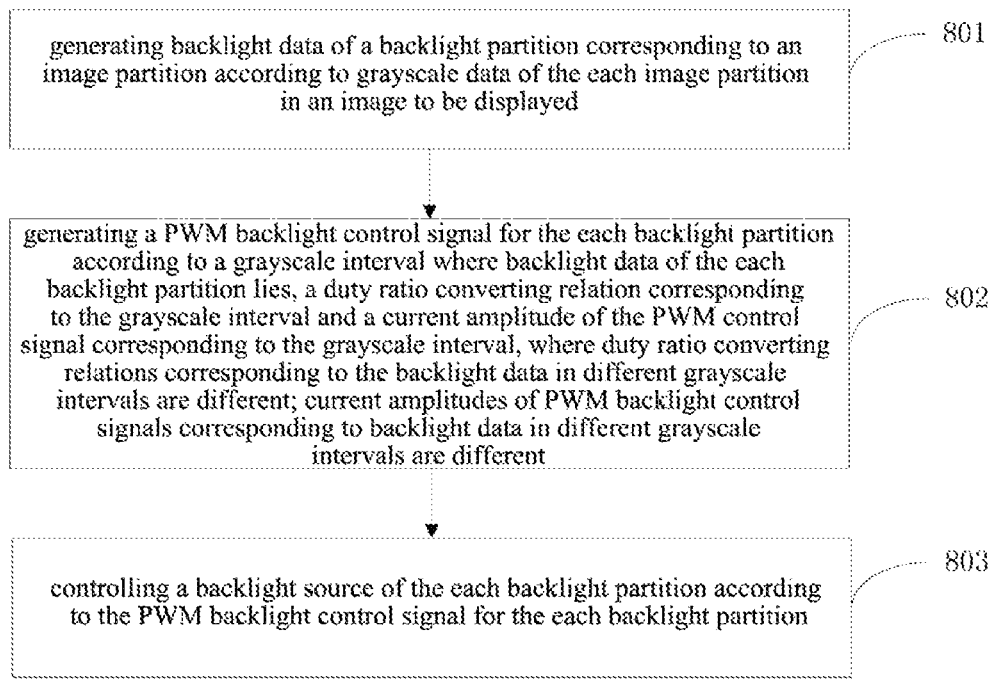
FIG. 8 is a flow diagram of yet another backlight control method according to an embodiment of the present application.

As shown in FIG. 8, the present application provides another backlight control method for use in a liquid crystal display device. The method may include:

step 801, generating backlight data of a backlight partition corresponding to an image partition according to grayscale data of each of the image partition in an image to be displayed;

step 802, generating a PWM backlight control signal for each of the backlight partition according to a grayscale interval where backlight data of the each of the backlight partition lies, a duty ratio converting relation corresponding to the grayscale interval and a current amplitude of the PWM control signal corresponding to the grayscale interval, where duty ratio converting relations corresponding to the backlight data in different grayscale intervals are different; current amplitudes of PWM backlight control signals corresponding to backlight data in different grayscale intervals are different; and step 803, controlling a backlight source of the each of the backlight partition according to the PWM backlight control signal for the each of the backlight partition.

This method is different from the above two methods in that, the PWM backlight control signal for the each of the backlight partition is generated according to both the current amplitude and the duty ratio converting relation. Furthermore, backlight data of different grayscales correspond to different duty ratio converting relations and current amplitudes of different PWM backlight control signals.

In some embodiments, the grayscale interval refers to at least two grayscale intervals from grayscale value 0 to the maximum displayable grayscale value of the liquid crystal display device.

Figure 9:
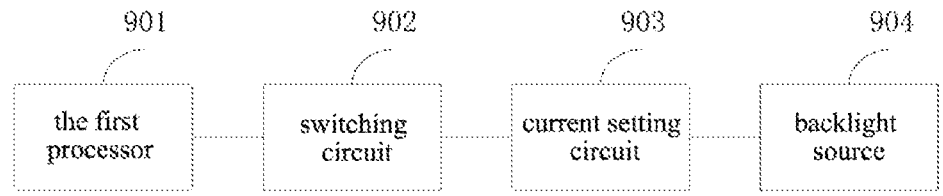
FIG. 9 is a schematic structural diagram of a liquid crystal display device according to an embodiment of the present application.
Figure 10:
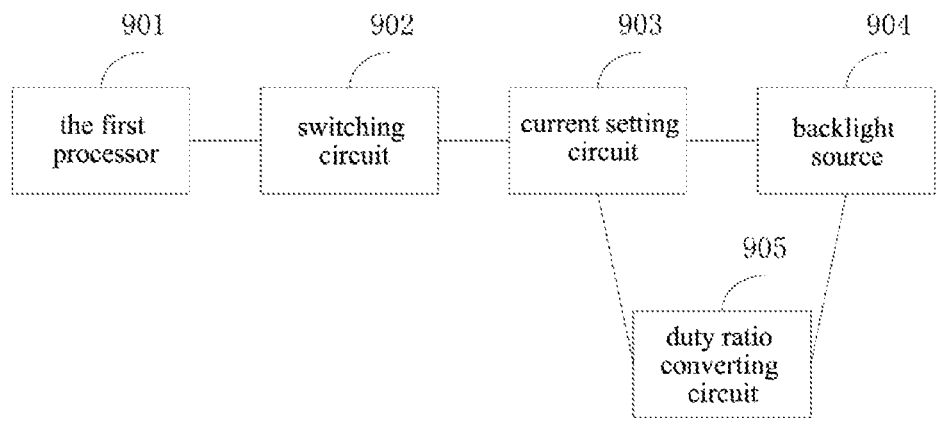
FIG. 10 is another schematic structural diagram of a liquid crystal display device according to an embodiment of the present application.

As shown in FIG. 9, the present application provides a liquid crystal display device, which may include:

a first processor 901, a switching circuit 902, a current setting circuit 903, and a backlight source 904; the first processor 901, the switching circuit 902, the current setting circuit 903, and the backlight source 904 are successively connected.

Where the first processor 901 is configured to generate backlight data of a backlight partition corresponding to an image partition according to grayscale data of each of the image partition in an image to be displayed, and to determine a grayscale interval where the backlight data of each of the backlight partition lies, where the image partition and the backlight partition are in one-to-one correspondence, and the backlight partition includes at least one backlight source 904;

the switching circuit 902 is configured to switch the backlight data to a corresponding current setting circuit 903 according to the grayscale interval where the backlight data of the each of the backlight partition lies, so as to generate a PWM backlight control signal for the each of the backlight partition, where current setting circuits corresponding to backlight data of different grayscale intervals are different; the different current setting circuits are used for generating PWM backlight control signals with different current amplitudes; and the backlight source 904 of the each of the backlight partition is turned on or off in response to the PWM backlight control signal for the each of the backlight partition.

In some embodiments, the liquid crystal display device may further include a duty ratio converting circuit 905. The duty ratio converting circuit 905 is respectively connected with the current setting circuit 903 and the backlight source 904.

Where, the duty ratio converting circuit 905 is configured to determine the duty ratio of the backlight control signal for the each of the backlight partition according to the backlight data of the each of the backlight partition and the current amplitude corresponding to the each of the current setting circuit.

In some embodiments, the current amplitudes of the PWM backlight control signals for the backlight partitions generated by a same current setting circuit are the same.

In some embodiments, the grayscale interval refers to at least two grayscale intervals from grayscale value 0 to the maximum displayable grayscale value of the liquid crystal display device.

The liquid crystal display device corresponds to the first backlight control method described above, and details will not be described herein again.

Figure 11:
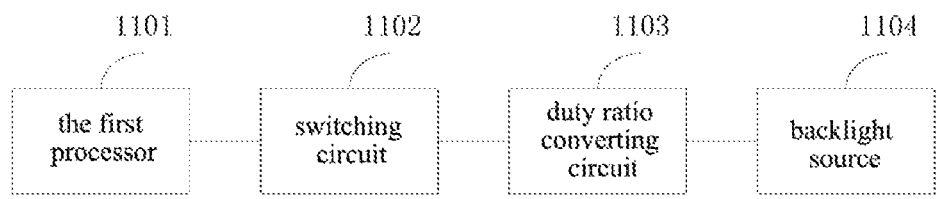
FIG. 11 is a schematic structural diagram of another liquid crystal display device according to an embodiment of the present application.
Figure 12:
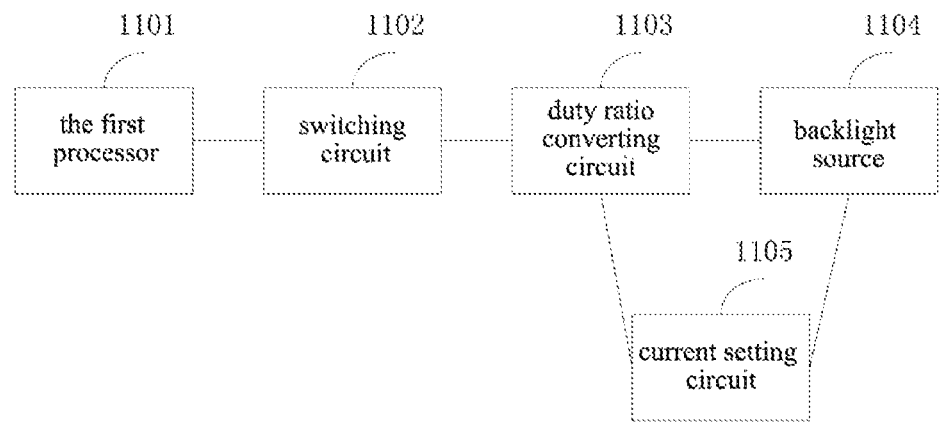
FIG. 12 is another schematic structural diagram of another liquid crystal display device according to an embodiment of the present application.

As shown in FIG. 11, the present application provides another liquid crystal display device, which may include:

a first processor 1101, a switching circuit 1102, a duty ratio converting circuit 1103 and a backlight source 1104; the first processor 1101, the switching circuit 1102, the duty ratio converting circuit 1103 and the backlight source 1104 are successively connected.

Where the first processor 1101 is configured to generate backlight data of a backlight partition corresponding to an image partition according to grayscale data of each of the image partition in an image to be displayed, and to determine a grayscale interval where the backlight data of each of the backlight partition lies, where the image partition and the backlight partition are in one-to-one correspondence, and the backlight partition includes at least one backlight source 1104;

the switching circuit 1102 is configured to switch the backlight data to a corresponding duty ratio converting circuit 1103 according to the grayscale interval where the backlight data of the each of the backlight partition lies, so as to generate a PWM backlight control signal for the each of the backlight partition, where duty ratio converting relations corresponding to different duty ratio converting circuits are different.

In some embodiments, there is a plurality of duty ratio converting circuits, and each of the duty ratio converting circuit corresponds to a duty ratio converting relation, duty ratio converting relations of different duty ratio converting circuits being different. Therefore, under the control of the switching circuit, different duty ratio converting circuits are selected for the backlight data in different intervals, so as to determine the duty ratio of the backlight data in the corresponding interval according to the backlight data and the corresponding duty ratio converting relation.

In other embodiments, there is one duty ratio switching circuit which can implement different logic relationships to invoke different duty ratio converting relations. The switching circuit 1102 is configured to according to the grayscale interval where the backlight data of the each of the backlight partition lies, control duty ratio circuit to invoke different duty ratio converting relations, where duty ratio converting relations corresponding to the backlight data in different grayscale intervals are different; The duty ratio converting circuit 1103 invokes different duty ratio converting relations to generate a PWM backlight control signal for the each of the backlight partition.

The backlight source 1104 of the each of the backlight partition is turned on or off in response to the PWM backlight control signal for the each of the backlight partition.

In some embodiments, the liquid crystal display device may further include a current setting circuit 1105. The current setting circuit 1105 is respectively connected to the duty ratio converting circuit 1103 and the backlight source 1104.

Where, the duty ratio converting circuit 1103 determines the duty ratio of the PWM backlight control signal for the each of the backlight partition according to the backlight data of each of the backlight partition; and the current setting circuit 1105 is configured to determine a current amplitude of a PWM backlight control signal for the each of the backlight partition according to the backlight data of each of the backlight partition and the duty ratio of the PWM backlight control signal for the each of the backlight partition.

In other words, a current setting circuit 1105 is further included, and the current setting circuit 1105 is respectively connected to the duty ratio converting circuit 1103 and the backlight source 1104; in some embodiments, the duty ratio converting circuit 1103 determines the duty ratio of the PWM backlight control signal for the each of the backlight partition according to the invoked duty ratio converting relation and the backlight data of each of the backlight partition; alternatively, in other embodiments, as different duty ratio converting circuits correspond to different duty ratio converting relations, the duty ratio of the backlight control signal for the each of the backlight partition is determined according to the duty ratio converting relation corresponding to the duty ratio circuit and the backlight data of each of the backlight partition. The current setting circuit 1105 is configured to determine a current amplitude of a PWM backlight control signal for the each of the backlight partition according to the backlight data of each of the backlight partition and the duty ratio of the PWM backlight control signal for the each of the backlight partition.

In some embodiments, the grayscale interval refers to at least two grayscale intervals from grayscale value 0 to the maximum displayable grayscale value of the liquid crystal display device.

The liquid crystal display device corresponds to the second backlight control method described above, and details will not be described herein again.

Figure 13:
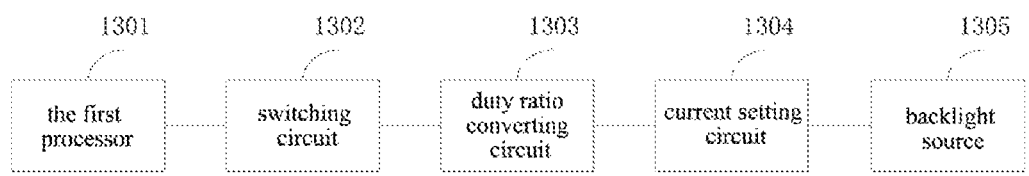
FIG. 13 is a schematic structural diagram of yet another liquid crystal display device according to an embodiment of the present application.

As shown in FIG. 13, the present application provides another liquid crystal display device, which may include:

a first processor 1301, a switching circuit 1302, a duty ratio converting circuit 1303, a current setting circuit 1304 and a backlight source 1305; the first processor 1301, the switching circuit 1302, the duty ratio converting circuit 1303, the current setting circuit 1304 and the backlight source 1305 are successively connected.

Where the first processor 1301 is configured to generate backlight data of a backlight partition corresponding to an image partition according to grayscale data of each of the image partition in an image to be displayed, and to determine a grayscale interval where the backlight data of each of the backlight partition lies, where the image partition and the backlight partition are in one-to-one correspondence, and the backlight partition includes at least one backlight source 1305; and the switching circuit 1302 is configured to switch the backlight data to a corresponding duty ratio converting circuit and a corresponding current setting circuit 1304 according to the grayscale interval where the backlight data of the each of the backlight partition lies, so as to generate a PWM backlight control signal for the each of the backlight partition, where duty ratio converting relations corresponding to different duty ratio converting circuits 1303 are different; current amplitudes of the PWM backlight control signals corresponding to different current setting circuits 1302 are different.

In some embodiments, the switching circuit 1302 is configured to control the duty ratio converting circuit 1303 to invoke different duty ratio converting relations and switches the output of the duty ratio circuit to the corresponding current setting circuit 1304, so as to generate a PWM backlight control signal for the each of the backlight partition, where duty ratio converting relations corresponding to the different grayscale intervals are different; current amplitudes of the PWM backlight control signals corresponding to different current setting circuits 1304 are different.

In some embodiments, there is a plurality of duty ratio converting circuits, and each of the duty ratio converting circuit corresponds to a duty ratio converting relation, duty ratio converting relations of different duty ratio converting circuits being different. Therefore, under the control of the switching circuit, different duty ratio converting circuits are selected for the backlight data in different intervals, so as to determine the duty ratio of the backlight data in the corresponding interval according to the backlight data and the corresponding duty ratio converting relation and to switch the output of the duty ratio circuit to the corresponding current setting circuit 1304, thus to generate the PWM backlight control signal for the each of the backlight partition, where duty ratio converting relations corresponding to the different grayscale intervals are different; current amplitudes of the PWM backlight control signals corresponding to different current setting circuits 1304 are different.

In some embodiments, the quantity of current setting circuit may be one, and the current setting circuit may be a logic circuit including a plurality of combinations. Through the implementation of different logic circuits, information of duty ratio with different current amplitudes are outputs, with logic circuits of different combinations corresponding to different current amplitudes. In other embodiments, there is a plurality of current setting circuits, and each of the current setting circuit corresponds to each of the amplitude. Both of these current setting circuits can be used in the present application. When both the current setting circuit and the duty ratio converting circuit are multiple, a logic switch can be used to match any current setting circuit with duty ratio converting circuit to generate different combinations.

The backlight source 1305 of the each of the backlight partition is turned on or off in response to the PWM backlight control signal for the each of the backlight partition.

In some embodiments, the grayscale interval refers to at least two grayscale intervals from grayscale value 0 to the maximum displayable grayscale value of the liquid crystal display device.

The liquid crystal display device corresponds to the third backlight control method described above, and details will not be described herein again.

Figure 14:
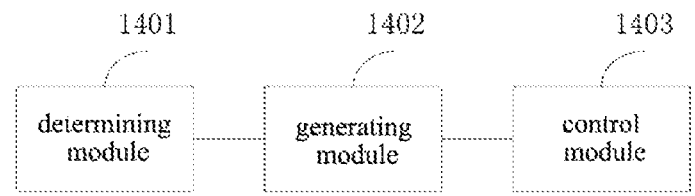
FIG. 14 is a schematic structural diagram of a backlight control device according to an embodiment of the present application.

As shown in FIG. 14, the present application provides a backlight control device. The device may include: a determining module 1401, a generating module 1402, and a control module 1403; the determining module 1401, the generating module 1402, and the control module 1403 are successively connected; where the determining module 1401 is configured to generate backlight data of a backlight partition corresponding to an image partition according to grayscale data of each of the image partition in an image to be displayed; the generating module 1402 is configured to generate a PWM backlight control signal for each of the backlight partition according to a grayscale interval where the backlight data of the each of the backlight partition lies, where current amplitudes of PWM backlight control signals corresponding to backlight data in different grayscale intervals are different; the control module 1403 is configured to control a backlight source of the each of the backlight partition according to the PWM backlight control signal for the each of the backlight partition.

In some embodiments, the generating module 1402 is configured to: determine a current amplitude of a PWM backlight control signal for the each of the backlight partition according to the grayscale interval where the backlight data of the each of the backlight partition lies and the corresponding relation between the grayscale interval and the current amplitude of the PWM backlight control signal;

determine a duty ratio of the PWM backlight control signal for the each of the backlight partition according to the backlight data of the each of the backlight partition and the current amplitude of the PWM backlight control signal for the each of the backlight partition; and determine the PWM backlight control signal for the each of the backlight partition according to the current amplitude of the PWM backlight control signal for the each of the backlight partition and a duty ratio of the PWM backlight control signal for the each of the backlight partition.

In some embodiments, the current amplitudes of the PWM backlight control signals for the respective backlight partitions generated according to the backlight data of the respective backlight partitions in the same grayscale interval are the same.

In some embodiments, the grayscale interval refers to at least two grayscale intervals from grayscale value 0 to the maximum displayable grayscale value of the liquid crystal display device.

The backlight control device corresponds to the first backlight control method described above, and details will not be described herein again.

Figure 15:
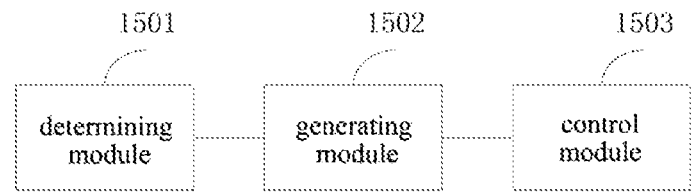
FIG. 15 is a schematic structural diagram of another backlight control device according to an embodiment of the present application.

As shown in FIG. 15, the present application provides another backlight control device. The device may include: a determining module 1501, a generating module 1502, and a control module 1503; the determining module 1501, the generating module 1502, and the control module 1503 are successively connected; where the determining module 1501 is configured to generate backlight data of a backlight partition corresponding to an image partition according to grayscale data of each of the image partition in an image to be displayed; the generating module 1502 is configured to generate a PWM backlight control signal for each of the backlight partition according to a grayscale interval where the backlight data of the each of the backlight partition lies, where duty ratio converting relations corresponding to the backlight data in different grayscale intervals are different; and the control module 1503 is configured to control a backlight source of the each of the backlight partition according to the PWM backlight control signal for the each of the backlight partition.

In some embodiments, the generating module 1502 is configured to: determine the duty ratio converting relation of the grayscale interval according to the grayscale interval where the backlight data of the each of the backlight partition lies, and the corresponding relation between the grayscale interval and the duty ratio converting relation; determine a duty ratio of the PWM backlight control signal for the each of the backlight partition according to the backlight data of the each of the backlight partition and the current amplitude of the PWM backlight control signal for the each of the backlight partition; determine the PWM backlight control signal for the each of the backlight partition according to the current amplitude of the PWM backlight control signal for the each of the backlight partition and a duty ratio of the PWM backlight control signal for the each of the backlight partition.

In some embodiments, the grayscale interval refers to at least two grayscale intervals from grayscale value 0 to the maximum displayable grayscale value of the liquid crystal display device.

The backlight control device corresponds to the second backlight control method described above, and details will not be described herein again.

Figure 16:
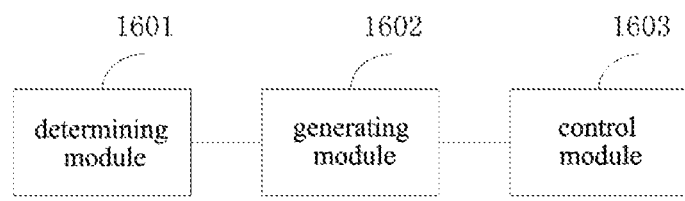
FIG. 16 is a schematic structural diagram of yet another backlight control device according to an embodiment of the present application.

As shown in FIG. 16, the present application provides a backlight control device. The device may include: a determining module 1601, a generating module 1602, and a control module 1603; the determining module 1601, the generating module 1602, and the control module 1603 are successively connected; where the determining module 1601 is configured to generate backlight data of a backlight partition corresponding to an image partition according to grayscale data of each of the image partition in an image to be displayed; the generating module 1602 is configured to generate a PWM backlight control signal for each of the backlight partition according to a grayscale interval where backlight data of the each of the backlight partition lies, a duty ratio converting relation corresponding to the grayscale interval and a current amplitude of the PWM control signal corresponding to the grayscale interval, where duty ratio converting relations corresponding to the backlight data in different grayscale intervals are different; current amplitudes of PWM backlight control signals corresponding to backlight data in different grayscale intervals are different; the control module 1603 is configured to control a backlight source of the each of the backlight partition according to the PWM backlight control signal for the each of the backlight partition.

In some embodiments, the generating module 1402 is configured to: determine a current amplitude of a PWM backlight control signal for the each of the backlight partition according to grayscale interval where the backlight data of the each of the backlight partition lies and the corresponding relation between the grayscale interval and the current amplitude of the PWM backlight control signal;

determine a duty ratio of the PWM backlight control signal for the each of the backlight partition according to the backlight data of the each of the backlight partition and the current amplitude of the PWM backlight control signal for the each of the backlight partition; and determine the PWM backlight control signal for the each of the backlight partition according to the current amplitude of the PWM backlight control signal for the each of the backlight partition and a duty ratio of the PWM backlight control signal for the each of the backlight partition.

In some embodiments, the grayscale interval refers to at least two grayscale intervals from grayscale value 0 to the maximum displayable grayscale value of the liquid crystal display device.

The backlight control device corresponds to the third backlight control method described above, and details will not be described herein again.

Based on the embodiments mentioned above, the present application is further described below with reference to the embodiments.

Figure 1:
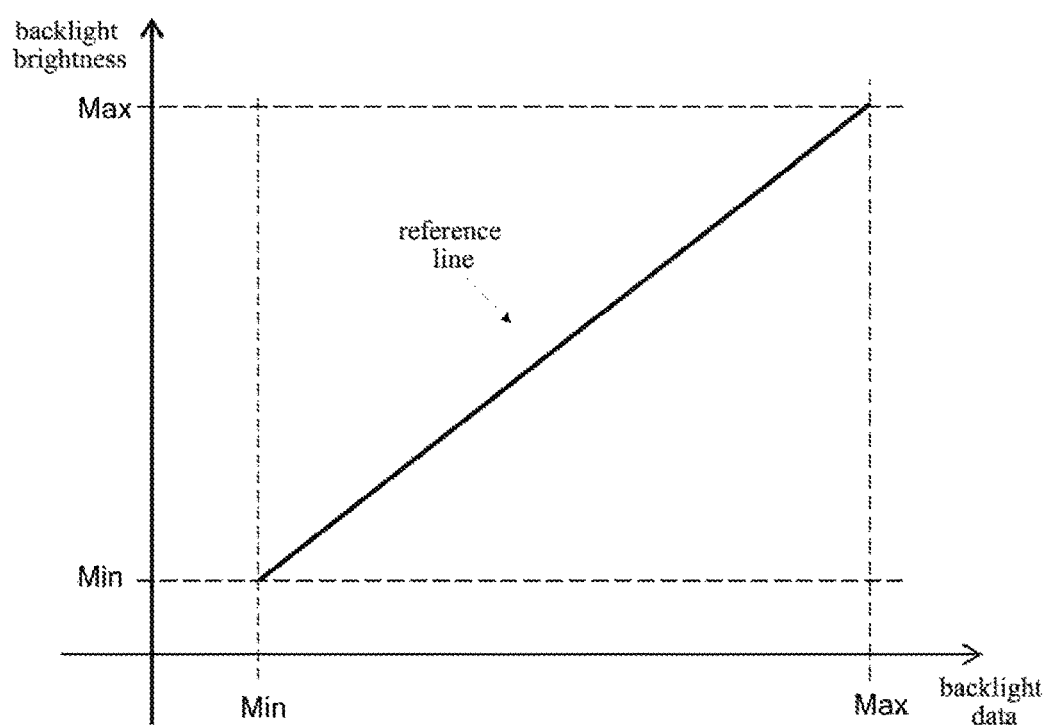
FIG. 1 is a schematic diagram of a backlight brightness control curve in the related art.

In the related art, when the backlight brightness is controlled by using the PWM backlight control signal, the corresponding PWM backlight control signal is determined by adjusting the PWM duty ratio. The backlight data included in the PWM duty ratio signal scales linearly with the backlight brightness (for example, with a slope of 2.1). As shown in FIG. 1, when the backlight brightness is dynamically adjusted according to the backlight data, the brightness changing trends of low grayscale images and high grayscale images are consistent. Therefore, not only the backlight brightness corresponding to the portion of the high grayscale image is increased, but also the backlight brightness corresponding to portion of the low grayscale image is increased proportionally.

For example, in the image display, the backlight brightness of the portion of the low grayscale image and portion of the high grayscale image are increased in the same proportion, resulting in a black floating phenomenon in the portion of the low grayscale image. That is, the black image with the grayscale value 0 is usually the reference black, and when controlled at about 0.1-0.5 nit, the final display brightness is generally in line with a better cognitive range of the human eye to black. However, when the backlight brightness in the black picture is increased in a same proportion, the brightness of the reference black picture may be up to 1.0 nit or more, resulting in a brightness distortion of the reference black picture, while in the portion of the high grayscale image, the peak brightness of the backlight needs to be greatly adjusted to meet the requirements of a high contrast.

Figure 3:
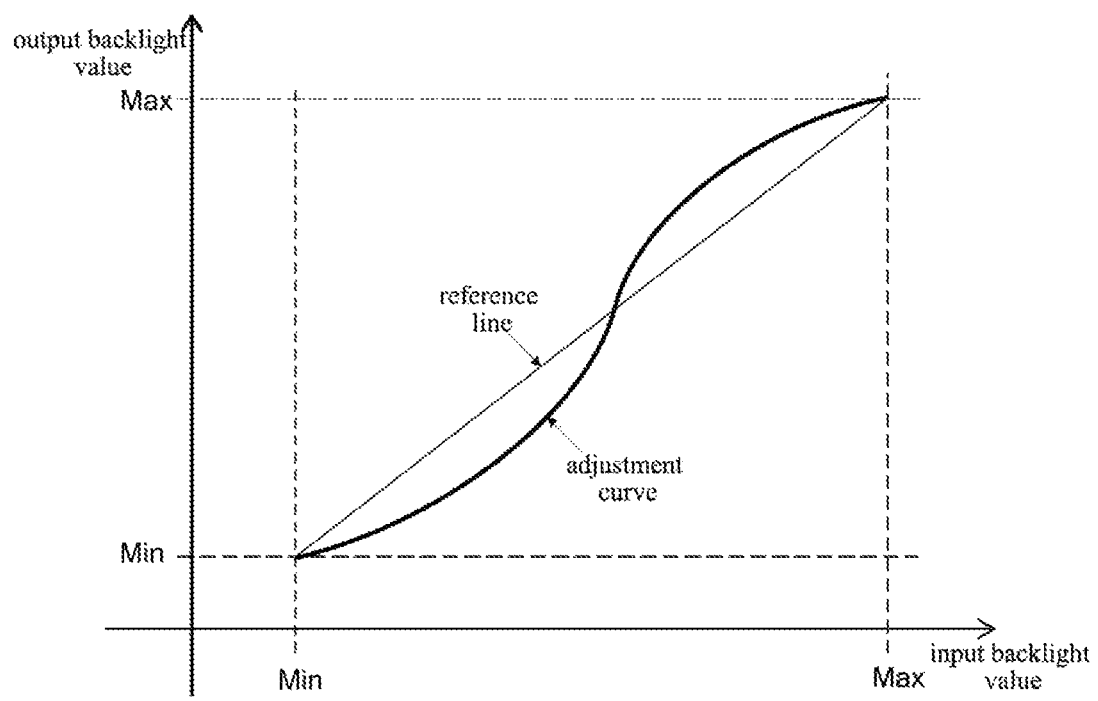
FIG. 3 is a schematic diagram of a backlight data adjustment curve after the backlight gain as shown in FIG. 2 is applied.

In order to solve the problem of the brightness distortion caused by the increase in backlight brightness in a same proportion, as emerges in the portion of the low grayscale image, the backlight data is adjusted by presetting the product of the backlight gain value and the backlight data, and the backlight brightness of the dark scenario part is adjusted by different backlight gain values in the related art. FIG. 2 is a schematic diagram of backlight value gain curve in the related art, and FIG. 3 is a schematic diagram of an S-shaped adjustment curve of the backlight value after the backlight gain shown in FIG. 2 is applied. As shown in FIG. 2 and FIG. 3, when the backlight value is small, the backlight gain is small; as the backlight value increases, the details of the image gradation become more and the gain amplitude of the backlight also increases; when the backlight value is large, the image content is close to the brightness saturation, and the gain amplitude of the backlight decreases.

Figure 17:
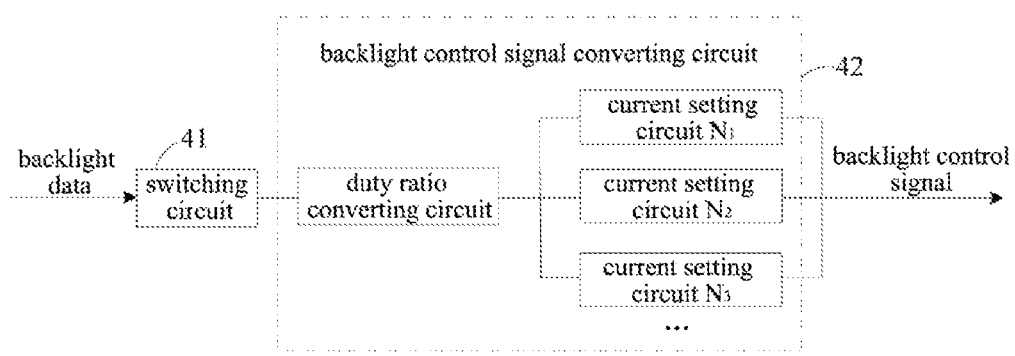
FIG. 17 is a schematic diagram of a circuit for converting backlight data into a backlight control signal in a liquid crystal display device according to some embodiments of the present application.

Referring to FIG. 17, in the process of determining the PWM backlight control signal, the backlight control signal converting circuit 42 is a circuit of multiple different combinations formed by one duty ratio converting circuit and three current setting circuits, where the one duty ratio circuit can be combined with the current setting circuits $N_1$, $N_2$ and $N_3$ respectively to form three kinds of converting circuits, so as to generate different PWM backlight control signals and control the backlight brightness according to the PWM backlight control signal. And the switching circuit 41 is configured to instruct to switch to a different current setting circuit according to the instructing electric signals generated from the backlight data in the three grayscale intervals.

In some embodiments, the duty ratio converting circuit is configured to generate the duty circle of the PWM backlight control signal according to the backlight data and a predetermined ratio relation of the duty ratio. The predetermined ratio relation is determined by the duty ratio converting circuit's own circuit parameters, which can be linear or non-linear, but it is certain that parameters of the duty ratio converting circuit determine the predetermined ratio relation.

The current setting circuits $N_1$, $N_2$ and $N_3$ are configured to respectively determine different current amplitudes of the PWM backlight control signals generated corresponding to the three gray intervals. In order to increase the backlight brightness of the highlighted image, the output current amplitude of the highlight grayscale interval used to instruct the switching to the current setting circuit is larger than that of the low light grayscale interval. In the same grayscale interval, the current amplitudes converted from the backlight data to the PWM backlight control signal are the same.

Figure 19:
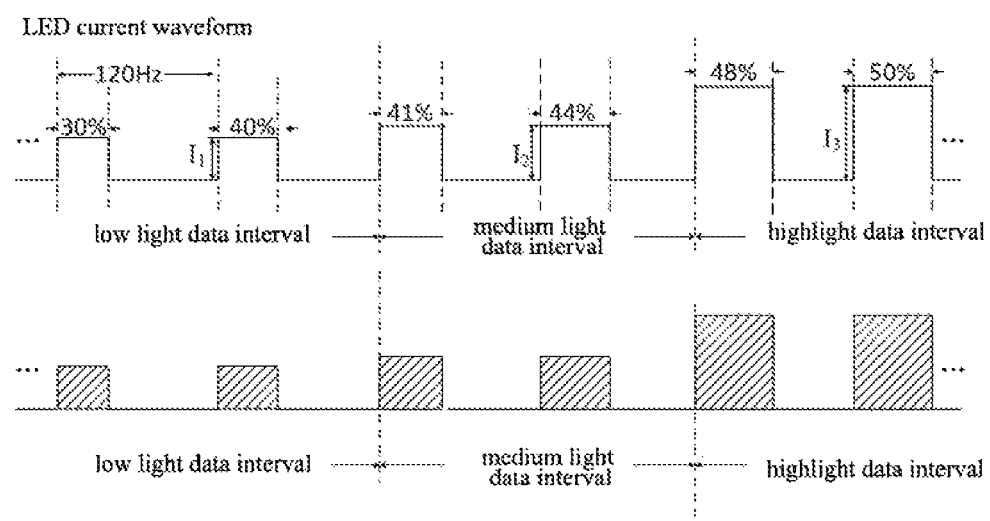
FIG. 19 is a schematic diagram of a duty ratio/current adjusted by a circuit for converting backlight data into a backlight control signal according to an embodiment of the present application.

In some embodiments, FIG. 19 is a schematic diagram of duty ratio/current amplitude adjusted by a circuit for converting backlight data into a backlight control signal according to an embodiment of the present application. As shown in FIG. 19, when the scanning frequency of the liquid crystal display panel is 120 Hz, the scanning period (frame period) T=$\frac{1}{120}$ Hz is about 8.3 ms. The backlight duty ratio is the ratio of the backlight source lighting time in a frame period to the frame period. For example, the backlight duty ratio is 30%, that is, the backlight source lighting time is 8.3 ms*30%=2.49 ms in the frame period.

It can be seen from the combination of FIG. 17 and FIG. 19 that the switching circuit instructs the PWM backlight control signal converting circuit to use the duty ratio converting circuit and the current setting circuit $N_1$ to adjust respectively the PWM duty ratios in the low light grayscale intervals to be 30%, 40%, and the current amplitude to be $I_1$ according to the instructing signal generated from the backlight data in the low light grayscale interval; the switching circuit instructs the PWM backlight control signal converting circuit to use the duty ratio converting circuit and the current setting circuit $N_2$ to adjust respectively the PWM duty ratios in the medium light grayscale intervals to be 41%, 44%, and the current amplitude to be $I_2$ according to the instructing signal generated from the backlight data in the medium light grayscale interval; the switching circuit instructs the PWM backlight control signal converting circuit to use the duty ratio converting circuit and the current setting circuit $N_3$ to adjust respectively the PWM duty ratios in the highlight grayscale intervals to be 30%, 40%, and the current amplitude to be $I_3$ ($I_3$>$I_2$>$I_1$) according to the instructing signal generated from the backlight data in the highlight grayscale interval; As such, three different PWM backlight control signals are respectively generated in the three gray intervals, and the backlight brightness is controlled according to the PWM backlight control signal.

In some embodiments, the brightness of the backlight controlled according to the PWM backlight control signal can be roughly compared with the accumulated value of the area obtained by multiplying the backlight source lighting time, which is represented by the PWM duty ratio, by the current value.

As shown in the shaded part in FIG. 19, the current amplitude of the PWM backlight control signal generated by the three grayscale intervals is variable. In one period of the PWM backlight control signal, when the duty ratios of the low light grayscale intervals are set to be respectively 30% and 40%, the backlight source lighting time is W30 and W40, and the corresponding current amplitude is $I_1$; when the duty ratios of the medium light grayscale intervals are set to be respectively 41% and 44%, the backlight source lighting time is W41 and W44, and the corresponding current amplitude is $I_2$; when the duty ratios of the highlight grayscale intervals are set to be respectively 48% and 50%, the backlight source lighting time is W48 and W50, and the corresponding current amplitude is $I_3$ ($I_3$>$I_2$>$I_1$); thus W30×$I_1$+W40×$I_1$<W41×$I_2$+W44×$I_2$<W48×$I_3$+W50×$I_3$, that is, the order from small to large of the brightness caused by the PWM control signal is as follows: low light grayscale interval<medium light grayscale interval<highlight grayscale interval.

Figure 20:
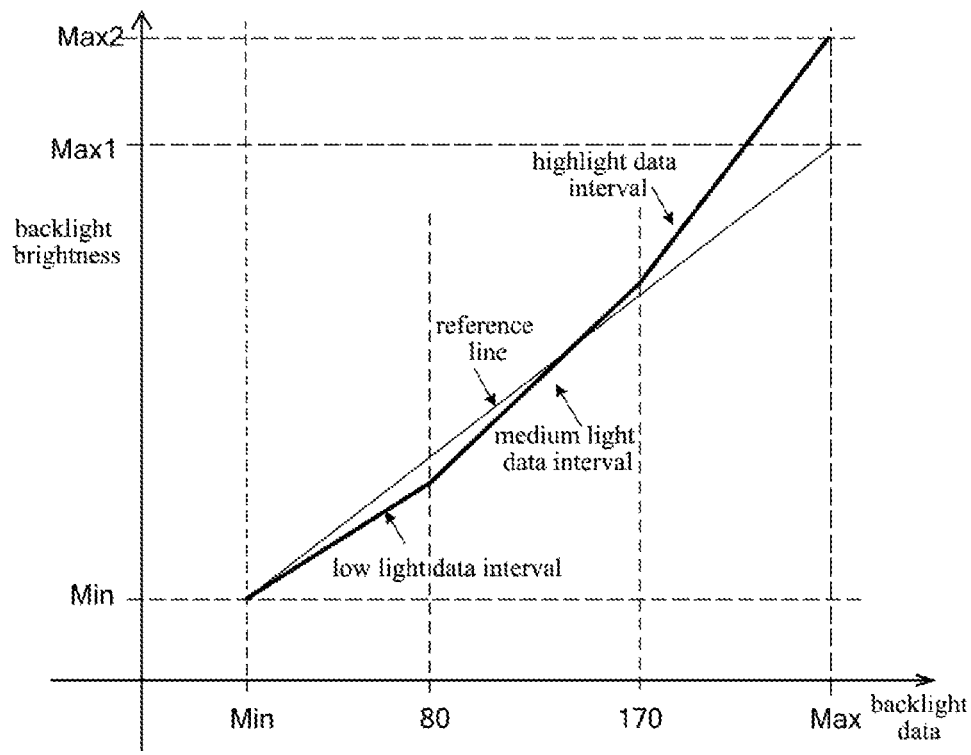
FIG. 20 is a schematic diagram of a backlight brightness control curve according to an embodiment of the present application.

FIG. 20 is a schematic diagram of a backlight brightness control curve according to an embodiment of the present application. As shown in FIG. 20, compared with the control curve of the backlight data and backlight brightness where the slope is 2.1 as applied in FIG. 1, the low light grayscale interval (slope of 0.4) adjusts the backlight brightness with a gentle control curve, bringing down the backlight brightness corresponding to the low grayscale image, which can solve the problem that the brightness distortion of the picture due to the increase of the backlight brightness in a same proportion in the related art and can display more details of the dark field; the medium light grayscale interval (slope of 2.8) adjusts the backlight brightness with a steep control curve, increasing the backlight brightness corresponding to the image in this interval; the highlight grayscale interval (slope of 3.7) adjusts the backlight brightness with a steeper control curve, further enlarging the adjusted range of the backlight brightness corresponding to the high grayscale image, moreover, the backlight peak brightness Max2 corresponding to the maximum backlight value is greater than Max1, which can increase the backlight peak brightness of the portion of the high grayscale image, so as to achieve a high contrast display effect.

In some embodiments, the backlight data is set to different grayscales by determining the backlight data which is converted from the image grayscale values and required to instruct to display the image and according to the different grayscale display requirements of the bright-dark scenarios in images. When the backlight data is in different grayscale intervals, a same duty ratio converting mode and a different current amplitude generating mode are adopted to generate a PWM backlight control signal expressed in duty ratio. Finally, the backlight brightness is controlled using the generated PWM backlight control signal.

It can be seen, compared with the related art where adjusting the PWM duty ratio to determine a corresponding PWM backlight control signal results in a consistent changing trend in the brightness of the low grayscale image and high grayscale image in the premise of a fixed current, the embodiments of the present application can set different backlight grayscale intervals according to the different grayscale display requirements of the bright-dark scenarios in images, with the current amplitudes of the PWM backlight control signals corresponding to different backlight gray intervals being variable, thus correspondingly backlight control signals for controlling different backlight brightnesses are generated. As such, the current amplitude of the PWM backlight control signal generated corresponding to portion of the low grayscale image is relatively low, thus the backlight brightness corresponding to the portion of the low grayscale image is brought down; The current amplitude in the PWM backlight control signal generated corresponding to the portion of the high grayscale image is relatively high, thus corresponding to a higher backlight peak brightness and achieving a higher contrast in the image area and a dynamic range for display.

Figure 21:
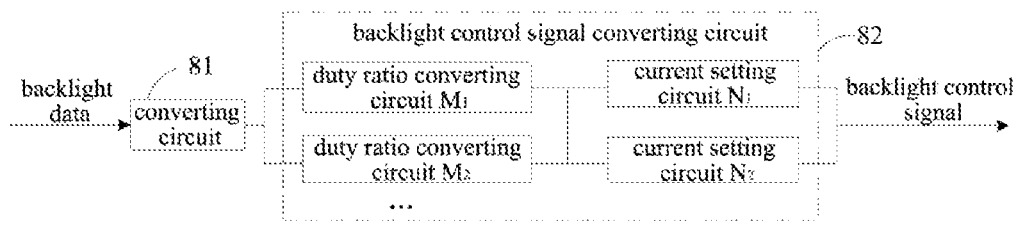
FIG. 21 is a schematic diagram of a circuit for converting backlight data into a backlight control signal in yet another liquid crystal display device according to an embodiment of the present application.

FIG. 21 is a schematic diagram of a circuit for converting backlight data into a backlight control signal in yet another liquid crystal display device according to an embodiment of the present application; As shown in FIG. 21, the circuit includes:

a backlight control signal converting circuit 82, including a plurality of duty ratio converting circuits with different circuit parameters and a plurality of current setting circuits with different circuit parameters, where different current setting circuits can output different current amplitudes;

a switching circuit 81, configured to switch to different combinations of the duty ratio converting circuit and the current setting circuit after the electrical signal instructing the backlight data to fall in different grayscale intervals is captured.

Where in the backlight control signal converting circuit, the plurality of duty ratio converting circuits are configured to output the PWM backlight control signal expressed in duty ratio by using a plurality of different predetermined ratio relations between the backlight data and the duty ratio, respectively. Where since it is certain that the circuit parameters of the same duty ratio converting circuit determine the predetermined converting ratio relation, the converting ratio ration varies with circuit parameters of different duty ratio converting circuits.

Multiple current setting circuits can set different current amplitudes for the PWM backlight control signal.

In some embodiments, the switching circuit 81 is configured to correspond to the first instructing signal in a first grayscale interval smaller than the first threshold, and instruct the switched PWM backlight control signal converting circuit to generate a PWM backlight control signal in a converting manner of a constant current and a non-linear duty ratio; and correspond to the second instructing signal in a second grayscale interval larger than the second threshold, and instruct the switched PWM backlight control signal converting circuit to generate a PWM backlight control signal in a converting manner of a different current and a linear duty ratio; where the second threshold is greater than the first threshold.

It is noted that the above "in a converting manner of a constant current and a non-linear duty ratio" refers to generating a PWM backlight control signal by means of a current setting circuit and a plurality of duty ratio converting circuits; correspondingly, the above "in a converting manner of a different current and a linear duty ratio" refers to generating a PWM backlight control signal by means of a plurality of current setting circuits and a duty ratio converting circuit.

The following describes in detail an example of converting backlight data in different gray intervals into a corresponding backlight control signal.

In some embodiments, the backlight data is also set into the low light grayscale interval, the medium light grayscale interval and the highlight grayscale interval as shown in embodiment 1 according to the different grayscale display requirements of the bright-dark scenarios in images, where the grayscale data and the backlight data in the three grayscale intervals are sorted from small to large as follows: low light grayscale interval<medium light grayscale interval<highlight grayscale interval.

As shown in FIG. 21, the switching circuit 81, is configured to instruct to switch to a different PWM backlight control signal converting circuit 82 according to the instructing signals generated from the backlight data in the above three grayscale intervals. The different PWM backlight control signal converting circuits 82 is a circuit of multiple different combinations formed by two duty ratio converting circuits and two current setting circuits. The two duty ratio converting circuits $M_1$ and $M_2$ are configured to determine the duty ratio of the PWM backlight control signal by using two predetermined ratio relations of the backlight data and the duty ratio respectively. The current setting circuits $N_1$ and $N_2$ are configured to respectively determine different current amplitudes of the PWM backlight control signals generated corresponding to the three gray intervals.

Figure 22:
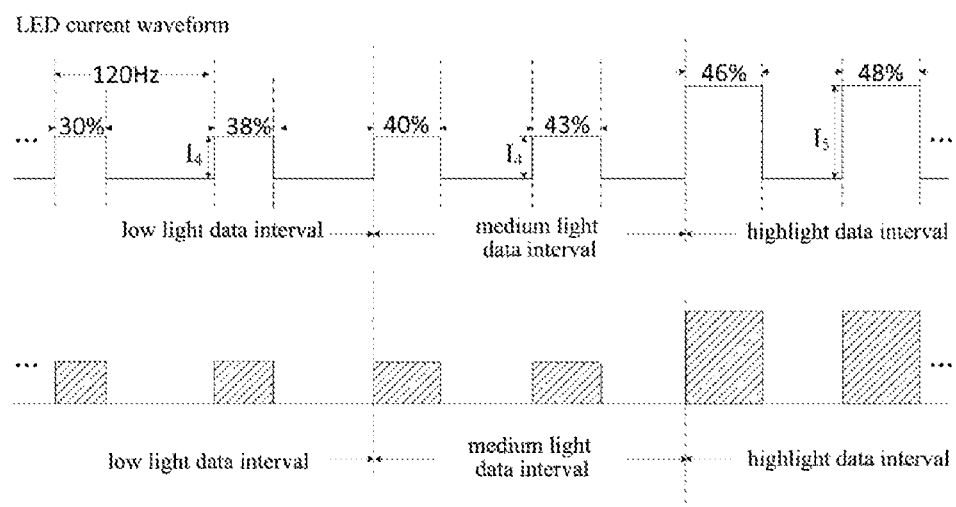
FIG. 22 is another schematic diagram of a duty ratio/current adjusted by a converting circuit converting backlight data to a backlight control signal according to an embodiment of the present application.

FIG. 22 is another schematic diagram of a duty ratio/current adjusted by a converting circuit converting backlight data to a backlight control signal according to an embodiment of the present application.

It can be seen from the combination of FIG. 21 and FIG. 22 that the switching circuit instructs the PWM backlight control signal converting circuit to use the duty ratio converting circuit $M_1$ and the current setting circuit $N_1$ to adjust respectively the PWM duty ratios in the low light grayscale intervals to be 30%, 38%, and the current amplitude to be $L_4$ according to the instructing signal generated from the backlight data in the low light grayscale interval; the switching circuit instructs the PWM backlight control signal converting circuit to use the duty ratio converting circuit $M_2$ and the current setting circuit $N_1$ to adjust respectively the PWM duty ratios in the medium light grayscale intervals to be 40%, 43%, and the current amplitude to be $L_4$ according to the instructing signal generated from the backlight data in the medium light grayscale interval; the switching circuit instructs the PWM backlight control signal converting circuit to use the duty ratio converting circuit $M_2$ and the current setting circuit $N_2$ to adjust respectively the PWM duty ratios in the highlight grayscale intervals to be 46%, 48%, and the current amplitude to be $I_5$ ($I_5>I_4$) according to the instructing signal generated from the backlight data in the highlight grayscale interval. As such, three different PWM backlight control signals are respectively generated in the three gray intervals, and the backlight brightness is controlled according to the PWM backlight control signal.

Similarly, the brightness of the backlight controlled according to the PWM backlight control signal can be roughly compared with the accumulated value of the area obtained by multiplying the backlight source lighting time, which is represented by the PWM duty ratio, by the current value. And it follows that the order from small to large of the brightness caused by the PWM control signal is as follows: low light grayscale interval<medium light grayscale interval<highlight grayscale interval.

Figure 23:
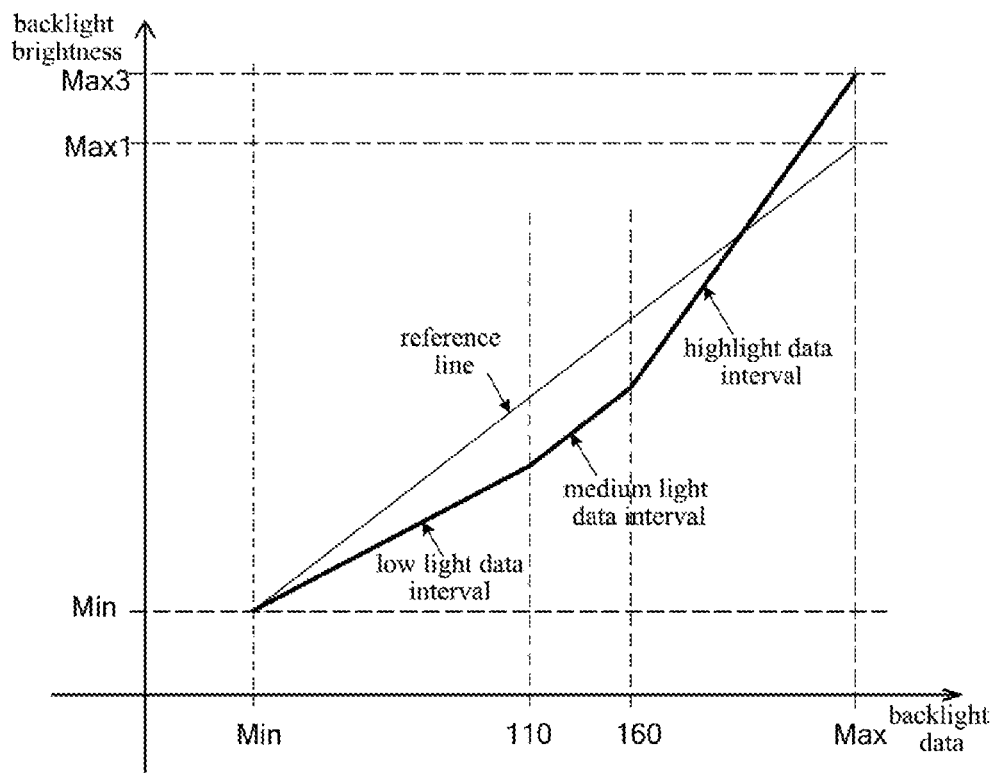
FIG. 23 is a schematic diagram of another backlight brightness control curve according to an embodiment of the present application.

FIG. 23 is a schematic diagram of another backlight brightness control curve according to an embodiment of the present application. As shown in FIG. 23, compared with the control curve of the backlight data and backlight brightness where the slope is 2.1 as applied in FIG. 1, the low light grayscale interval (slope of 0.4) adjusts the backlight brightness with a gentle control curve, bringing down the backlight brightness corresponding to the low grayscale image, which can solve the problem that the brightness distortion of the picture due to the increase of the backlight brightness in a same proportion in the related art and can display more details of the dark field. The medium light grayscale interval also uses the control curve with the same slope as shown in FIG. 1 to adjust the backlight brightness, the backlight brightness adjustment range corresponding to this interval is unchanged, but the backlight brightness correspondingly decreases; the highlight grayscale interval (slope of 3.5) adjusts the backlight brightness with steeper control curve, further enlarging the adjusted range of the backlight brightness corresponding to the high grayscale image, moreover, the backlight peak brightness Max3 corresponding to the maximum backlight value is greater than Max1, which can increase the backlight peak brightness of the portion of the high grayscale image, so as to achieve a high contrast display effect.

It should be noted that, in the three grayscale intervals in this embodiment, the PWM backlight control signal converting circuit is not limited to the following cases: the low light grayscale interval is a combination of the duty ratio converting circuit $M_1$ and the current setting circuit $N_1$, the medium light grayscale interval is a combination of the duty ratio converting circuit $M_2$ and the current setting circuit $N_1$, the highlight grayscale interval is a combination of the duty ratio converting circuit $M_2$ and the current setting circuit $N_2$, so as to generate different PWM backlight control signals. Different combinations of circuits may also be used to generate a PWM backlight control signal of a desired backlight brightness according to a backlight brightness requirement in a specific grayscale interval, for example, a combination of the duty ratio converting circuit $M_1$ and the current setting circuit $N_2$, and will not defined herein.

And the output of the duty ratio circuit is switched to the corresponding current setting circuit 1304, to generate the PWM backlight control signal for the each backlight partition, where duty ratio converting relations corresponding to the different grayscale intervals are different; current amplitudes of the PWM backlight control signals corresponding to different current setting circuits 1304 are different. In some embodiments, when the backlight data is in different grayscale intervals, a different duty ratio converting mode and a different current amplitude generating mode are adopted to generate a PWM backlight control signal for controlling backlight brightness as expressed in duty ratio.

It can be seen that the embodiments of the present, application can set different backlight grayscale intervals according to the different grayscale display requirements of the bright-dark scenarios in images, with both the duty ratios and current amplitudes of the PWM backlight control signals corresponding to different backlight gray intervals being variable, thus correspondingly backlight control signals for different backlight brightnesses requirements are generated. As such, according to different grayscale display requirements of bright-dark scenarios, the performance of low grayscale of a dark scenario is enhanced, the brightness of bright scenario is increased, thus a better contrast of image area and a dynamic range of display are achieved to enhance the picture quality.

Figure 24:
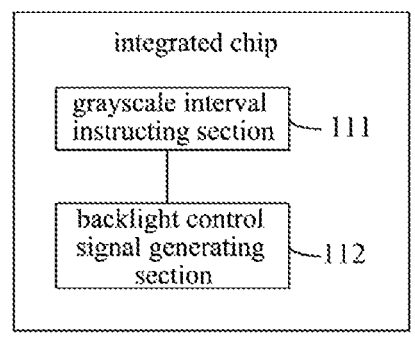
FIG. 24 is a schematic diagram of an integrated chip converting backlight data into a backlight control signal according to an embodiment of the present application.

FIG. 24 is a schematic diagram of an integrated chip for converting backlight data into a backlight control signal in yet one liquid crystal display device according to an embodiment of integration the present application. As shown in FIG. 24, the integrated chip may include:

a grayscale interval instructing section 111, configured to generate a different instructing signal from different grayscale intervals where the backlight data lies; and a backlight control signal generating section 112, configured to select a different current generating mode according to the different instructing signal, and generate a PWM backlight control signal expressed in duty ratio.

In some embodiments, the grayscale interval instructing section 111 is configured to output an instructing signal corresponding to the backlight data in the predefined relation, where the predefined relation indicates that different grayscale intervals correspond to different instructing signals.

In some embodiments, according to at least one arbitrary threshold of grayscale data, the data from grayscale value 0 to the maximum displayable grayscale value of the liquid crystal display device is divided into a plurality of grayscale intervals and then the corresponding backlight data is determined according to the grayscale data in different gray intervals. Where the plurality of grayscale intervals include at least a highlight grayscale interval and a low light grayscale interval.

In some embodiments, the backlight control signal generating section 112 is configured to determine the duty ratio of the PWM backlight control signal by using predetermined ratio relation of the backlight data and the duty ratio; and generate a different current value of the PWM backlight control signal in a different current generating mode, where the current value output under the current generating mode selected by the instruction corresponding to the highlight grayscale interval is greater than the low light grayscale data interval; finally, a PWM backlight control signal of a desired backlight brightness is generated by the different PWM backlight control signal generating section 112.

In some embodiments, an embodiment of the present application further provides an integrated chip for converting backlight data to a backlight control signal in a liquid crystal display device, which is different from the integrated chip shown in FIG. 24 in that:

a backlight control signal generating section, configured to select a different duty ratio converting mode and a different current generating mode according to a different instructing signal generated by the grayscale interval instructing section 111, so as to generate a PWM backlight control signal.

In some embodiments, the duty ratio of the PWM backlight control signal is determined according to respectively a plurality of different predetermined ratio relation of the backlight data and the duty ratio under different duty ratio converting modes; and in different current generation modes, PWM backlight control signals are respectively determined according to different current values.

In some embodiments, the grayscale interval instructing section is configured to generate a corresponding third instructing signal in a third gray interval smaller than the third threshold; the backlight control signal generating section, is configured to select a current generating mode of a constant current duty and a duty ratio converting mode for converting the non-linear duty ratio according to the third instructing signal, and generate a PWM backlight control signal.

And the grayscale interval instructing section is configured to generate a corresponding fourth instructing signal in a fourth grayscale interval greater than the fourth threshold; the backlight control signal generating section, is configured to select a current generating mode of a different current duty and a duty ratio converting mode for converting the non-linear duty ratio according to the fourth instructing signal, and generate a PWM backlight control signal; where the fourth threshold is greater than the third threshold. Finally, the backlight brightness is controlled according to the generated PWM backlight control signal.

The present application further provides a liquid crystal display device, which may include: a liquid crystal display panel and a backlight source, and any one of the above is configured to implement a converting circuit or an integrated chip for converting backlight data into a backlight control signal.

It should be noted that, the liquid crystal display device may further include other components, such as a backlight processing unit and a PWM driver, and other components included in the liquid crystal display device will not be described in detail herein.

Persons of ordinary skill in the art should understand that, all or a part of the steps for implementing the above method embodiments may be implemented by hardware relevant to program instructions. The above program may be stored in a computer-readable storage medium, and when the program is executed, the steps including the above method embodiments are performed. The foregoing storage medium includes various media, such as a ROM, a RAM, a magnetic disk, or an optical disk that can store program codes.

Finally, it should be noted that the foregoing embodiments are merely intended for describing the technical solutions of the present application, rather than limiting the present application. Although the present application has been described in detail with reference to the foregoing embodiments, it should be understood by those of ordinary skill in the art that: the technical solutions described in the foregoing embodiments may still be modified or equivalent replacements may be made to some or all of the technical features in the embodiments; however, these modifications or replacements do not make the essence of corresponding technical solutions depart from the scope of the technical solutions in the embodiments of the present application.

What is claimed is:

1. A backlight control method, comprising:
   generating backlight data of a backlight partition corresponding to an image partition according to grayscale data of the image partition in an image to be displayed;
   determining a current amplitude of a PWM backlight control signal for the backlight partition according to a grayscale interval where the backlight data lies and a corresponding relation between the grayscale interval and the current amplitude, wherein current amplitudes of PWM backlight control signals corresponding to backlight data in different grayscale intervals are different;
   determining a duty ratio of the PWM backlight control signal according to the backlight data and the current amplitude; and
   determining the PWM backlight control signal according to the current amplitude and the duty ratio; and
   controlling a backlight source of the backlight partition according to the PWM backlight control signal.

2. The method according to claim 1, wherein,
   current amplitudes of PWM backlight control signals for respective backlight partitions generated according to backlight data of the respective backlight partitions in a same grayscale interval are the same.

3. The method according to claim 1, wherein,
   the grayscale interval refers to at least two grayscale intervals from grayscale value 0 to a maximum displayable grayscale value of a liquid crystal display device.

4. A backlight control method, comprising:
   generating backlight data of a backlight partition corresponding to an image partition according to grayscale data of the image partition in an image to be displayed;
   determining a duty ratio converting relation of a grayscale interval where the backlight data lies according to the grayscale interval, and a corresponding relation between the grayscale interval and the duty ratio converting relation, where duty ratio converting relations corresponding to backlight data in different grayscale intervals are different;
   determining a duty ratio of a PWM backlight control signal for the backlight partition according to the backlight data and the duty ratio converting relation;
   determining a current amplitude of the PWM backlight control signal according to the backlight data and the duty ratio; and
   determining the PWM backlight control signal according to the current amplitude and the duty ratio; and
   controlling a backlight source of the backlight partition according to the PWM backlight control signal.

5. The method according to claim 4, wherein,
   the grayscale interval refers to at least two grayscale intervals from grayscale value 0 to a maximum displayable grayscale value of a liquid crystal display device.

6. A liquid crystal display device, comprising a first processor, a switching circuit, a current setting circuit, and a backlight source; the first processor, the switching circuit, the current setting circuit, and the backlight source are successively connected;
   wherein the first processor is configured to generate backlight data of a backlight partition corresponding to an image partition according to grayscale data of image partition in an image to be displayed, and to determine a grayscale interval where the backlight data lies, where the image partition and the backlight partition are in one-to-one correspondence, and the backlight partition comprises at least one backlight source;
   the switching circuit is configured to switch the backlight data to a corresponding current setting circuit according to the grayscale interval, to generate a PWM backlight control signal for the backlight partition, wherein current setting circuits corresponding to different grayscale intervals are different; the different current setting circuits are used for generating PWM backlight control signals with different current amplitudes; and
   the backlight source of the backlight partition is turned on or off in response to the PWM backlight control signal.

7. The liquid crystal display device according to claim 6, further comprising a duty ratio converting circuit, wherein the duty ratio converting circuit is respectively connected with the current setting circuit and the backlight source;
   the duty ratio converting circuit is configured to determine a duty ratio of the PWM backlight control signal for the backlight partition according to the backlight data and a current amplitude corresponding to the current setting circuit.

8. The liquid crystal display device according to claim 6, wherein, current amplitudes of the PWM backlight control signals for the backlight partitions generated by a same current setting circuit are the same.

9. The liquid crystal display device according to claim 6, wherein, the grayscale interval refers to at least two grayscale intervals from grayscale value 0 to a maximum displayable grayscale value of the liquid crystal display device.

10. A liquid crystal display device, comprising a first processor, a switching circuit, a duty ratio converting circuit and a backlight source; the first processor, the switching circuit, the duty ratio converting circuit and the backlight source are successively connected;
   wherein the first processor is configured to generate backlight data of a backlight partition corresponding to an image partition according to grayscale data of image partition in an image to be displayed, and to determine a grayscale interval where the backlight data lies, wherein the image partition and the backlight partition are in one-to-one correspondence, and the backlight partition comprises at least one backlight source;
   the switching circuit is configured to switch the backlight data to the corresponding duty ratio converting circuit according to the grayscale interval, to generate a PWM backlight control signal for the backlight partition, wherein duty ratio converting relations corresponding to different duty ratio converting circuits are different; and
   the backlight source of the backlight partition is turned on or off in response to the PWM backlight control signal.

11. The liquid crystal display device according to claim 10, further comprising a current setting circuit, the current setting circuit is respectively connected with the duty ratio converting circuit and the backlight source;
   the duty ratio converting circuit determines a duty ratio of the PWM backlight control signal according to the backlight data; and
   the current setting circuit is configured to determine a current amplitude of the PWM backlight control signal according to the backlight data and the duty ratio.

12. The liquid crystal display device according to claim 10, wherein the grayscale interval refers to at least two grayscale intervals from grayscale value 0 to a maximum displayable grayscale value of the liquid crystal display device.

13. A liquid crystal display device, comprising: a first processor, a switching circuit, a duty ratio converting circuit, current setting circuit and a backlight source; the first processor, the switching circuit, the duty ratio converting circuit, the current setting circuit and the backlight source are successively connected;
   wherein the first processor is configured to generate backlight data of a backlight partition corresponding to an image partition according to grayscale data of image partition in an image to be displayed, and to determine a grayscale interval where the backlight data lies, wherein the image partition and the backlight partition are in one-to-one correspondence, and the backlight partition comprises at least one backlight source;
   the switching circuit is configured to switch the backlight data to a corresponding duty ratio converting circuit and a corresponding current setting circuit according to the grayscale interval, to generate a PWM backlight control signal for the backlight partition, wherein duty ratio converting relations corresponding to different duty ratio converting circuits are different; current amplitudes of the PWM backlight control signals corresponding to different current setting circuits are different; and
   the backlight source of the backlight partition is turned on or off in response to the PWM backlight control signal.

14. The liquid crystal display device according to claim 13, wherein,
   the grayscale interval refers to at least two grayscale intervals from grayscale value 0 to a maximum displayable grayscale value of the liquid crystal display device.

* * * * *